(12) United States Patent
Kano

(10) Patent No.: US 11,192,445 B2
(45) Date of Patent: Dec. 7, 2021

(54) AIR INTAKE GRILLE AND VEHICLE

(71) Applicant: HONDA MOTOR CO., LTD., Tokyo (JP)

(72) Inventor: Hiroshi Kano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/627,603

(22) PCT Filed: Apr. 23, 2018

(86) PCT No.: PCT/JP2018/016482
§ 371 (c)(1),
(2) Date: Dec. 30, 2019

(87) PCT Pub. No.: WO2019/008871
PCT Pub. Date: Jan. 10, 2019

(65) Prior Publication Data
US 2020/0122568 A1    Apr. 23, 2020

(30) Foreign Application Priority Data
Jul. 6, 2017    (JP) .............................. JP2017-132869

(51) Int. Cl.
*B60K 11/00*    (2006.01)
*B60K 11/06*    (2006.01)
(Continued)

(52) U.S. Cl.
CPC ................ *B60K 11/06* (2013.01); *B60K 1/04* (2013.01); *B62D 25/20* (2013.01); *B60K 2001/0433* (2013.01)

(58) Field of Classification Search
CPC ........... B60K 1/04; B60K 11/06; B62D 25/20
(Continued)

(56) References Cited

U.S. PATENT DOCUMENTS 3,068,891 A * 12/1962 Panning ................. G05D 7/018
                                                             137/499
7,419,209 B1 * 9/2008 Mangiapane ........... B60L 58/26
                                                             296/208

(Continued)

FOREIGN PATENT DOCUMENTS

GB    2381067 A    4/2003
JP    2015-209115 A    11/2015
(Continued)

OTHER PUBLICATIONS

Jan. 18, 2021, Indian Office Action issued for related IN Application No. 202047000265.
(Continued)

*Primary Examiner* — Hau V Phan
(74) *Attorney, Agent, or Firm* — Paratus Law Group, PLLC

(57) ABSTRACT

An air intake grille through which air in a passenger compartment of a vehicle V is taken in includes a frame body, a plurality of first grille forming portions and second grille forming portions arranged in a lattice shape inside the frame body, and a flow rate adjusting plate disposed inside the frame body so as to be perpendicular to the first grille forming portions and the second grille forming portions. The flow rate adjusting plate has a flow rate adjusting window having an opening area smaller than an opening portion inside the opening portion formed by the first grille forming portion and the second grille forming portion.

10 Claims, 5 Drawing Sheets

(51) Int. Cl.
*B60K 1/04* (2019.01)
*B62D 25/20* (2006.01)

(58) Field of Classification Search
USPC ........................................................ 180/68.1
See application file for complete search history.

(56) References Cited

U.S. PATENT DOCUMENTS

| | | | | |
|---|---|---|---|---|
| 8,311,708 | B2* | 11/2012 | Kerns | G06F 17/00 |
| | | | | 701/49 |
| 8,316,974 | B2* | 11/2012 | Coel | B60K 11/085 |
| | | | | 180/68.1 |
| 8,535,126 | B2* | 9/2013 | Fincher | F24F 13/105 |
| | | | | 454/258 |
| 9,623,741 | B2* | 4/2017 | Honda | H01M 10/6563 |
| 2006/0079166 | A1* | 4/2006 | Dippel | B60H 1/345 |
| | | | | 454/115 |
| 2008/0296075 | A1* | 12/2008 | Zhu | B60N 2/5621 |
| | | | | 180/68.1 |
| 2009/0183935 | A1* | 7/2009 | Tsuchiya | B60K 1/04 |
| | | | | 180/68.1 |
| 2010/0241308 | A1* | 9/2010 | Kikuchi | B60H 1/00849 |
| | | | | 701/36 |
| 2010/0276220 | A1* | 11/2010 | Kubota | H01M 10/613 |
| | | | | 180/68.1 |
| 2012/0247848 | A1* | 10/2012 | Kosaka | B60L 1/003 |
| | | | | 180/68.1 |
| 2013/0000864 | A1* | 1/2013 | Yamatani | B60H 1/00278 |
| | | | | 165/59 |
| 2013/0092348 | A1* | 4/2013 | Bito | H01M 10/625 |
| | | | | 165/41 |
| 2014/0262573 | A1* | 9/2014 | Ito | H01M 10/613 |
| | | | | 180/68.5 |
| 2015/0253781 | A1* | 9/2015 | Ashton | F24F 11/75 |
| | | | | 454/256 |
| 2016/0301120 | A1 | 10/2016 | Katsuno et al. | |

FOREIGN PATENT DOCUMENTS

| | | |
|---|---|---|
| JP | 2016-084026 A | 5/2016 |
| JP | 2016-199105 A | 12/2016 |

OTHER PUBLICATIONS

Jun. 19, 2018, International Search Report issued for related PCT Application No. PCT/JP2018/016482.
Jun. 19, 2018, International Search Opinion issued for related PCT Application No. PCT/JP2018/016482.

* cited by examiner

AIR INTAKE GRILLE AND VEHICLE

CROSS REFERENCE TO PRIOR APPLICATION

This application is a National Stage Patent Application of PCT International Patent Application No. PCT/JP2018/016482 (filed on Apr. 23, 2018) under 35 U.S.C. § 371, which claims priority to Japanese Patent Application No. 2017-132869 (filed on Jul. 6, 2017), which are all hereby incorporated by reference in their entirety.

TECHNICAL FIELD

The present invention relates to an air intake grille through which air in a passenger compartment of a vehicle is taken in and a vehicle equipped with the air intake grille.

BACKGROUND ART

Battery units accommodating batteries (high-voltage batteries) for driving motors are mounted on electric vehicles such as hybrid electrical vehicles (HEVs) and electrical vehicles (EVs). This type of vehicle has a cooling structure for cooling the battery and an air cooling type cooling structure is widely adopted.

For example, a vehicle has been known in which a battery unit is disposed under a seat of a passenger compartment and a battery is cooled by air (hereinafter referred to as air in the passenger compartment as appropriate) introduced from the passenger compartment into the battery unit. A dust-proof filter or the like is provided in an intake portion for taking in air in the passenger compartment in order to remove foreign objects or the likes. However, when a dust-proof filter is provided, pressure loss may occur and cooling efficiency may be reduced.

Therefore, in recent years, a lattice-shaped air intake grille is arranged in the intake portion to remove foreign objects or the like (see Patent Literature 1, for example).

CITATION LIST

Patent Literature

[Patent Literature 1]: JP-A-2015-209115

SUMMARY OF INVENTION

Technical Problem

However, around the air intake grille, the flow velocity of air taken in becomes faster, which may cause discomfort to a passenger.

The invention provides an air intake grille and a vehicle which can adjust the flow velocity of air taken into the air intake grille.

Solution to Problem

The invention provides the following aspects. In the parentheses, corresponding elements in embodiments described below are shown as an example, but the invention is not limited to this.

(1) An air intake grille (air intake grille 40) through which air in a passenger compartment of a vehicle (vehicle V) is taken in, where
the air intake grille includes a frame body (frame body 41), a plurality of first grille forming portions (first grille forming portions 42) and second grille forming portions (second grille forming portions 43) arranged in a lattice shape inside the frame body, and a flow rate adjusting plate (flow rate adjusting plate 44) disposed inside the frame body so as to be perpendicular to the first grille forming portions and the second grille forming portions, and
the flow rate adjusting plate has a flow rate adjusting window (flow rate adjusting window 46) having an opening area smaller than an opening portion (opening portion 45) inside the opening portion formed by the first grille forming portion and the second grille forming portion.

(2) The air intake grille according to (1), where
when the passenger compartment side is set as a front surface of the air intake grille, the flow rate adjusting plate is connected to the first grille forming portion and the second grille forming portion on a rear surface side of the air intake grille.

(3) The air intake grille according to (1) or (2), where
the frame body, the first grille forming portion, the second grille forming portion, and the flow rate adjusting plate are integrally formed.

(4) A vehicle (vehicle V) which includes the air intake grille according to any one of (1) to (3), an electric device (electric device D), a case (case 21) for accommodating the electric device, and an intake duct (intake duct 50) for connecting an intake port provided in the case and the air intake grille, where
the air intake grille and the intake port are arranged offset in a vehicle width direction.

(5) The vehicle according to (4), where
when the air intake grille is divided into two regions at a center in the vehicle width direction,
a sum of the opening areas of the flow rate adjusting windows located in a region (region P1) on an opposite side to the intake port is larger than a sum of the opening areas of the flow rate adjusting windows located in a region (region P2) on the intake port side.

(6) The vehicle according to (4), where
when the air intake grille is divided into three regions in the vehicle width direction,
the sum of the opening areas of the flow rate adjusting windows located in the central region (region Q2) is smaller than the sum of the opening areas of the flow rate adjusting windows located in the region (region Q1) on an opposite side to the intake port and is larger than the sum of the opening areas of the flow rate adjusting windows located in the region (region Q3) on the intake port side.

(7) The vehicle according to any one of (4) to (6), where
the air intake grille opens toward front or rear of the vehicle.

(8) The vehicle according to any one of (4) to (7), where
the passenger compartment is provided with a rear seat (rear seat 10) behind a kick-up portion (kick-up portion 33) formed so as to rise from a front floor panel (front floor panel 31),
the electric device is disposed below the rear seat, and
the air intake grille is disposed in the kick-up portion.

(9) The vehicle according to (8), where
the air intake grille is disposed in the kick-up portion in the center of the rear seat.

(10) The vehicle according to any one of (4) to (9), where
an intake passage of the intake duct is inclined upward from the air intake grille toward the intake port or has a step (step 53) upward from the air intake grille toward the intake port.

Advantageous Effects of Invention

According to the aspect described in (1), the flow rate adjusting plate has the flow rate adjusting window having the opening area smaller than the opening portion inside the opening portion formed by the first grille forming portion and the second grille forming portion. Therefore, in the opening portion on the passenger compartment side of the air intake grille, the flow velocity of the intake air can be reduced. As a result, vibration properties around the air intake grille can be improved and discomfort to a passenger can be reduced.

In addition, the air intake grille can prevent intrusion of foreign objects by the flow rate adjusting plate together with the first grille forming portion and the second grille forming portion.

According to the aspect described in (2), the flow rate adjusting plate is connected to the first grille forming portion and the second grille forming portion on the rear surface side of the air intake grille. Therefore, the flow rate adjusting plate can be arranged to the rear side by the amount of the widths of the first grille forming portion and the second grille forming portion in the front-rear direction. As a result, the appearance design of the air intake grille can be improved.

According to the aspect described in (3), since the frame body, the first grille forming portion, the second grille forming portion, and the flow rate adjusting plate are formed integrally, the manufacturing is easy and the handling property is excellent.

According to the aspect described in (4), since the air intake grille and the intake port are offset in the vehicle width direction, the air taken in from the air intake grille can be guided to the intake port while preventing the foreign objects which have entered from the air intake grille from entering the intake port.

According to the aspect described in (5), the flow velocity of the air taken into the air intake grille can be adjusted in the vehicle width direction. That is, when the air intake grille and the intake port are offset in the vehicle width direction, the air flow is fast in the region on the intake port side and the air flow is slow in the region on the opposite side to the intake port. Therefore, by making the sum of the opening areas of the flow rate adjusting windows located in the region on the opposite side to the intake port larger than the sum of the opening areas of the flow rate adjusting windows located in the region on the intake port side, the flow velocity of the air taken into the air intake grille can be averaged.

According to the aspect described in (6), the flow velocity of the air taken into the air intake grille can be adjusted in the vehicle width direction. That is, when the air intake grille and the intake port are offset in the vehicle width direction, the air flow is fast in the region on the intake port side and the air flow is slow in the region on the opposite side to the intake port. Therefore, by making the sum of the opening areas of the flow rate adjusting windows located in the central region smaller than the sum of the opening areas of the flow rate adjusting windows located in the region on the opposite side to the intake port and larger than the sum of the opening areas of the flow rate adjusting windows located in the region on the intake port side, the flow velocity of air taken into the air intake grille can be averaged.

According to the aspect described in (7), the air intake grille opens toward the front or rear of the vehicle. Therefore, when a passenger drops an object or the like, the foreign objects from above can be prevented from entering.

According to the aspect described in (8), since the air intake grille is disposed at the foot side of a passenger. Therefore, it is possible to reduce discomfort due to inhalation to the passenger compared to a case where the air intake grille is disposed above the seat.

According to the aspect described in (9), the air intake grille is arranged in the kick-up portion in the center of the rear seat which is not frequently used. Thus, the frequency of blockage of the air intake grille and the lifting of dust from the feet of a passenger can be reduced.

According to the aspect described in (10), it is possible to prevent water droplets and condensation water from entering from the intake port even when water droplets enter the inside of the intake duct or condensation occurs inside the intake duct.

DESCRIPTION OF EMBODIMENTS

Figure 1:
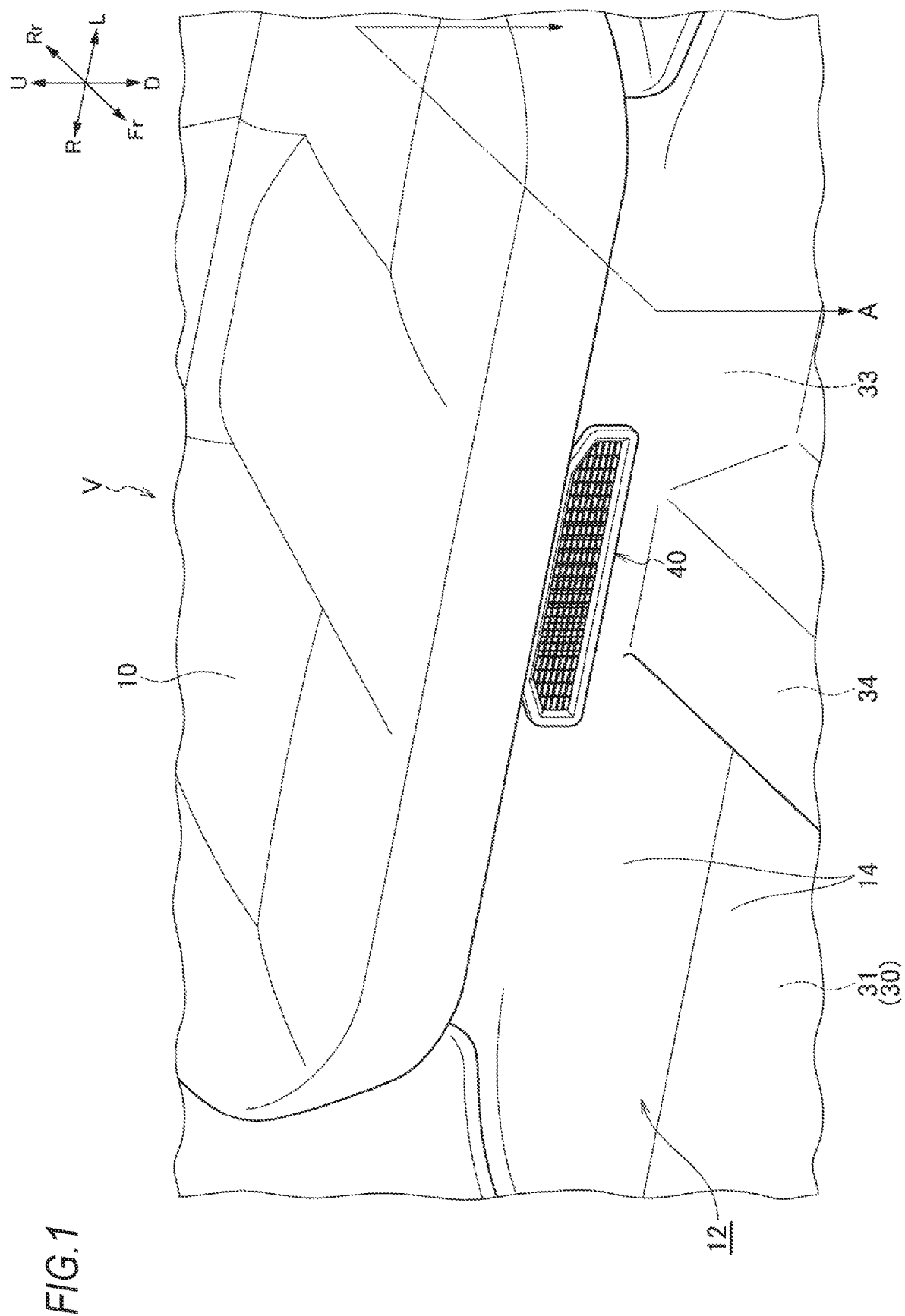
FIG. 1 is a perspective view of an essential part inside a vehicle on which air intake grille is mounted according to an embodiment of the invention.

Hereinafter, an embodiment of the invention will be described with reference to the drawings. The drawings shall be viewed in directions of the reference letters. In the following description, front-rear, left-right, and up-down correspond to directions seen from a driver, and in the drawing, the front of the vehicle is indicated by Fr, the rear is Rr, the left is L, the right is R, the upper is U, and the lower is D.

Figure 2:
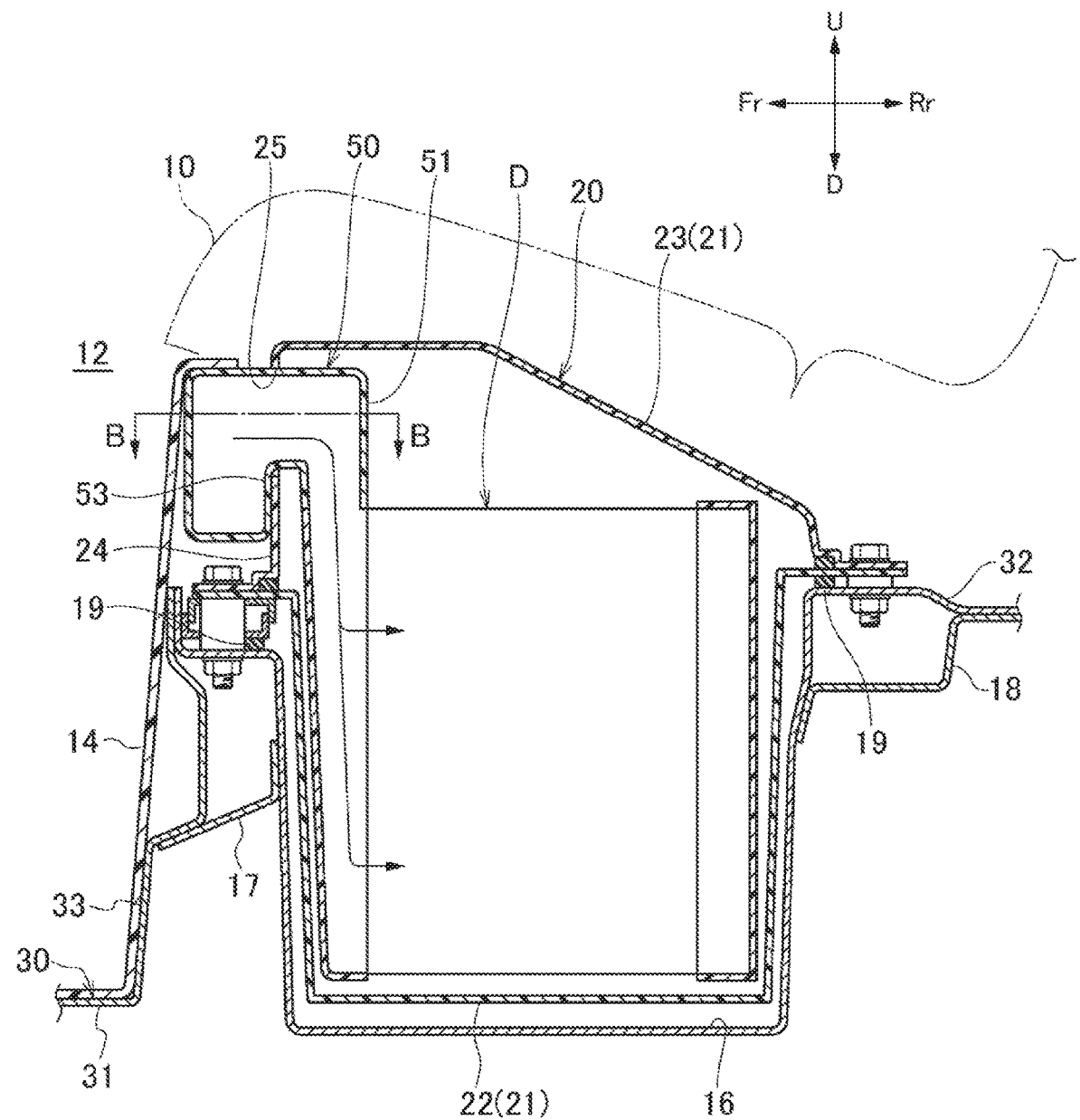
FIG. 2 is a cross-sectional view taken along the line A-A in FIG. 1.

A vehicle V of the embodiment illustrated in FIGS. 1 and 2 is an electric vehicle in which a battery unit 20 which accommodates a battery is mounted below a rear seat 10.

Floor Structure

As illustrated in FIG. 1 and FIG. 2, in a floor panel 30 of the vehicle V, a front floor panel 31 which constitutes a floor portion of a passenger compartment 12 and a rear floor panel 32 which constitutes a floor portion of a cargo compartment and the like are connected below the rear seat 10. In the drawing, reference numerals 14 denote a carpet which covers the floor panel 30.

On the front side of the rear floor panel 32, an accommodation recess portion 16 is provided and the battery unit 20 is accommodated therein. On the front side and the rear side of the accommodation recess portion 16, a front reinforcing portion 17 and a rear reinforcing portion 18 which straddle the left and right skeleton members are provided and the battery unit 20 is accommodated in the accommodating recess portion 16 in a state where the battery unit 20 is sealed by an annular seal member 19.

A kick-up portion 33 which rises upward is formed at a rear end portion of the front floor panel 31. Further, a center tunnel 34 is formed along a front-rear direction at the center of the front floor panel 31 in a vehicle width direction.

Figure 3:
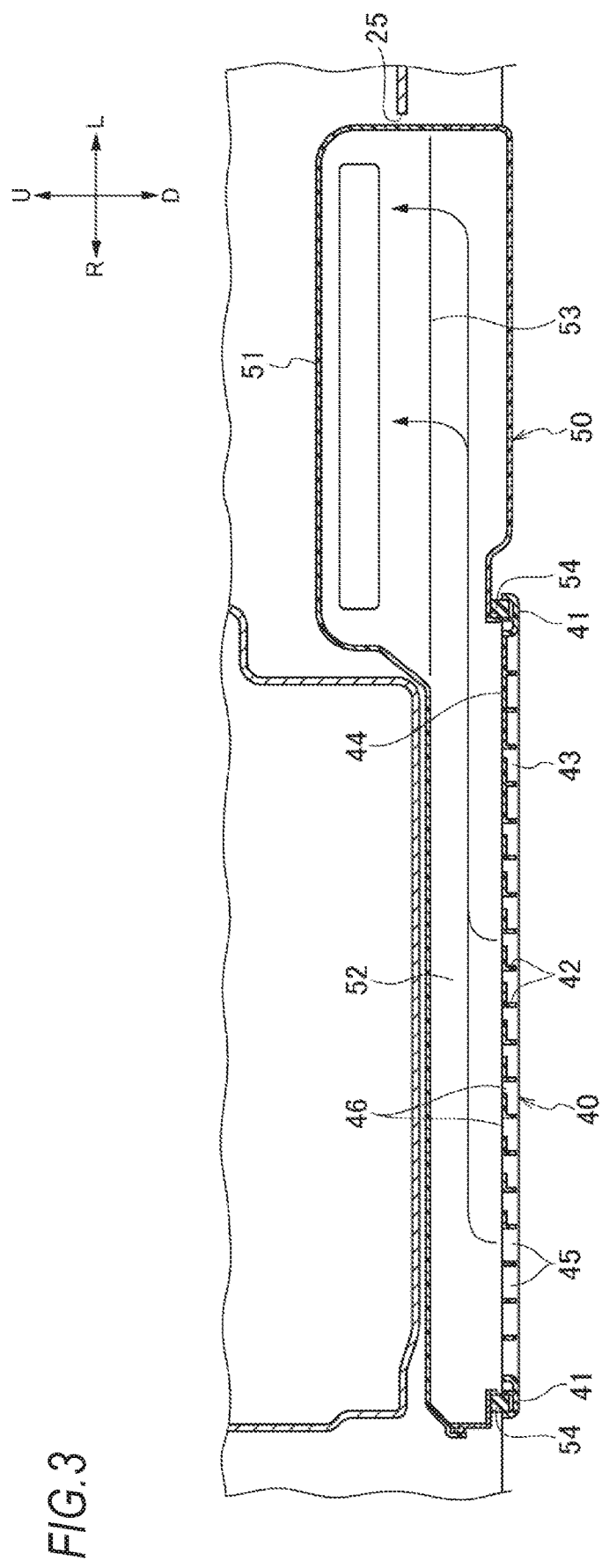
FIG. 3 is a cross-sectional view taken along the line B-B in FIG. 2.

An air intake grille 40 for taking in air in the passenger compartment is provided in the kick-up portion 33 located above the center tunnel 34 and below the center of the rear seat 10 so as to open forward. As illustrated in FIG. 3, the air intake grille 40 is attached to an intake duct 50 which guides air in the vehicle compartment to the battery unit 20 via the seal member 54.

Battery Unit

In the battery unit 20, a battery as an electric device D, a cooling mechanism for cooling the electric device D, and the like are accommodated in a case 21. The electric device D is not limited to a battery and may be a DC/DC converter, an inverter, or a combination thereof. The cooling mechanism includes a cooling fan which sucks air in the passenger compartment. The cooling fan may be disposed on the upstream side of the electric device D or may be disposed on the downstream side of the electric device D.

A case 21 is a resin member having a horizontally long, substantially rectangular parallelepiped shape with an upper opening and includes a box-shaped case main body 22 that opens upward and a lid member 23 that closes the opening of the case main body 22. The lid member 23 supports the seat front side (further front side than the buttocks) of the rear seat 10 on its upper surface.

A front wall portion 24 of the lid member 23 is provided with an intake port 25 into which an extension portion 51 of the intake duct 50 enters on the left side in the vehicle width direction.

Intake Duct

The intake duct 50 extends from the air intake grille 40 provided at the center of the vehicle V in the vehicle width direction to the left side in the vehicle width direction from the center in the vehicle width direction along the front wall portion 24 of the case body 22. The extension portion 51 extending rearward enters the intake port 25 provided in the front wall portion 24 of the lid member 23. That is, the air intake grille 40 is provided in one side (center in the vehicle width direction) of the intake duct 50 and the intake port 25 of the battery unit 20 is provided in the other side (left side in the vehicle width direction) of the intake duct 50. The air intake grille 40 and the intake port 25 are arranged offset in the vehicle width direction.

Further, a step 53 is provided in an intake passage 52 of the intake duct 50 upward from the air intake grille 40 toward the intake port 25. Accordingly, even when water droplets enter the inside of the intake duct 50 or when condensation occurs inside the intake duct 50, it is possible to prevent the water droplets and condensation from entering from the intake port 25. The intake passage 52 of the intake duct 50 may be inclined upward from the air intake grille 40 toward the intake port 25.

The air in the passenger compartment taken into the intake duct 50 from the air intake grille 40 flows along the front wall portion 24 of the lid member 23 from the center in the vehicle width direction to the left side in the vehicle width direction as indicated by arrows in FIGS. 2 and 3. The air in the passenger compartment is sent from the extension portion 51 which enters the inside of the case 21 from the intake port 25 toward the electric device D located at the lower side.

Air Intake Grille

Figure 4:
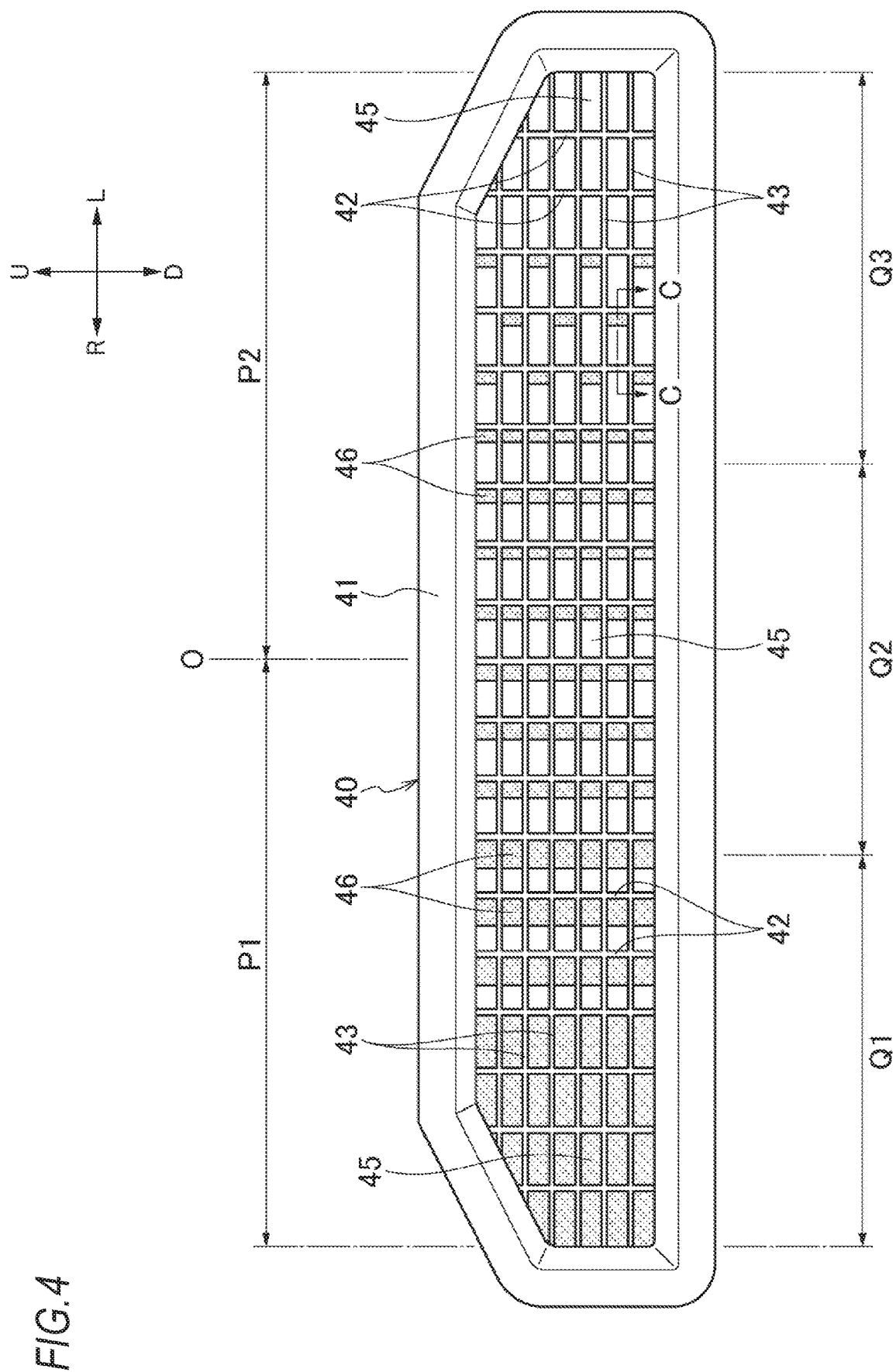
FIG. 4 is a front view of an air intake grille.

Next, the air intake grille 40 will be described in detail with reference to FIGS. 3 to 5.

The air intake grille 40 includes a rectangular frame body 41 with two upper corners cut away, a plurality of first grille forming portions 42 and second grille forming portions 43 disposed in a lattice pattern inside the frame body 41, and a flow rate adjusting plate 44 disposed inside the frame body 41 so as to be perpendicular to the first grille forming portion 42 and the second grille forming portion 43. It is preferable that the frame body 41, the first grille forming portion 42, the second grille forming portion 43, and the flow rate adjusting plate 44 are integrally formed by injection molding or the like.

The first grille forming portion 42 is a plate-shaped body which is long in an up-down direction and has a predetermined width in the front-rear direction and the plurality of first grille forming portions 42 are provided at equal intervals along the vehicle width direction. The second grille forming portion 43 is a plate-shaped body which is long in the left-right direction and has a predetermined width in the front-rear direction and the plurality of second grille forming portions 43 are provided at equal intervals along the up-down direction. The first grille forming portion 42 and the second grille forming portion 43 are arranged in a lattice shape by being orthogonal to each other when viewed from the front-rear direction and a plurality of rectangular opening portions 45 are formed.

The flow rate adjusting plate 44 is a plate-shaped body extending in the left-right direction and the up-down direction. When the passenger compartment side is set as the front surface of the air intake grille 40, it is connected to the first grille forming portion 42 and the second grille forming portion 43 on the rear surface side of the air intake grille 40. Further, the flow rate adjusting plate 44 has flow rate adjusting windows 46 having a smaller opening area than the openings 45 in all the opening portions 45 or a part of the opening portions 45. In a part of the air intake grille 40, the opening area of the opening portions 45 and the opening area of the flow rate adjusting windows 46 may be the same. In FIG. 4, the flow rate adjusting window 46 is indicated by dots.

Figure 5:
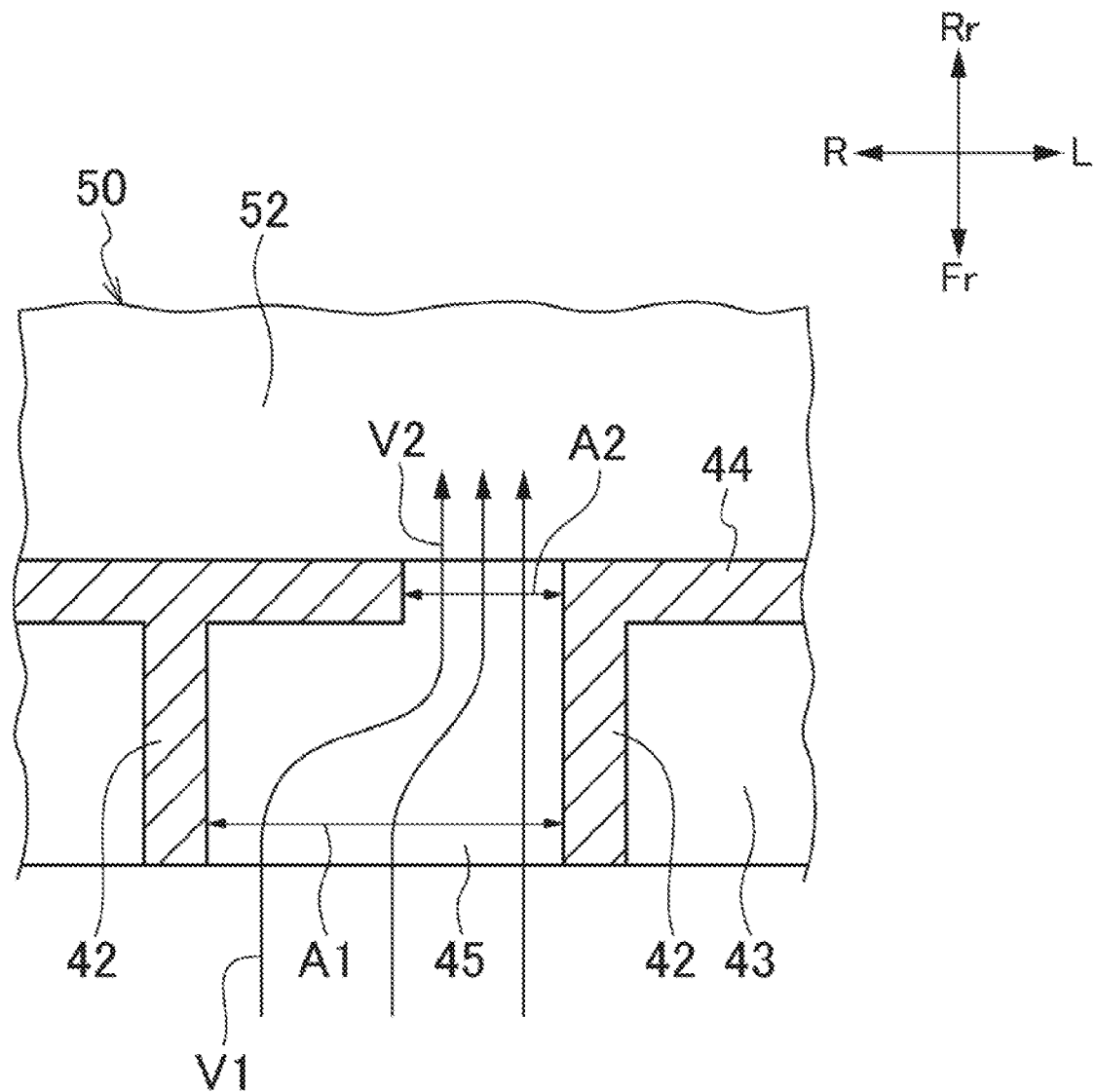
FIG. 5 is a cross-sectional view taken along the line C-C in FIG. 4.

Further, as illustrated in FIG. 5, in the opening portion 45 provided with the flow rate adjusting windows 46, air in the passenger compartment taken into the air intake grille 40 flows from the opening portion 45 to the intake duct 50 via the flow rate adjusting windows 46. In this case, since the opening area of the flow rate adjusting windows 46 is smaller than the opening area of the opening portions 45, the flow velocity decreases on the passenger compartment side of the opening portion 45 and the flow velocity increases in the flow rate adjusting windows 46.

To explain using an equation, when the opening area on the passenger compartment side of the opening portion 45 is set to A1 and the wind speed of the air flowing through the passenger compartment side of the opening portion 45 is set to V1, and further the opening area of the flow rate adjusting windows 46 is set to A2, and still further the wind speed of the air flowing through the flow rate adjusting windows 46 is set to V2, $A1 \cdot V1 = A2 \cdot V2$ is established because the air volume is the same between the passenger compartment side and the opposite side of the opening portion 45. The opening area A2 of the flow rate adjusting windows 46 is smaller than the opening area A1 of the opening portions 45, that is, $V1 < V2$ is derived from $A2 < A1$, and thus, the flow velocity V1 on the passenger compartment side of the opening portion 45 is smaller than the flow velocity V2 in the flow rate adjusting window 46. Therefore, the vibration properties around the air intake grille 40 are improved and discomfort to a passenger can be further reduced.

As described above, the air intake grille 40 and the intake port 25 are arranged offset in the vehicle width direction. Therefore, when the flow rate adjusting windows 46 are evenly arranged in the vehicle width direction of the air intake grille 40, the flow velocity of the air in the passenger compartment taken into the air intake grille 40 is fast on the intake port 25 side (in this embodiment, on the left side of the vehicle V, on the right side in FIG. 4) and the flow velocity decreases as it goes away from the intake port 25 in the vehicle width direction.

To eliminate such uneven flow velocity, in the embodiment, when the air intake grille 40 is divided into two areas P1 and P2 at the center O in the vehicle width direction, the sum of the opening areas of the flow rate adjusting windows 46 located in the area P1 on the opposite side to the intake port 25 is larger than the sum of the opening areas of the flow rate adjusting windows 46 located in the area P2 on the intake port 25 side.

Thus, by changing the opening area of the flow rate adjusting windows 46 according to the position of the intake port 25, the deviation of the flow velocity of the air in the passenger compartment taken into the air intake grille 40 can be adjusted in the vehicle width direction.

Furthermore, when the air intake grille 40 is divided into three areas Q1 to Q3 in the vehicle width direction, the sum of the opening areas of the flow rate adjusting windows 46 located in the central area Q2 is smaller than the sum of the opening areas of the flow rate adjusting windows 46 located in the area Q1 on the opposite side to the intake port 25 and is larger than the sum of the opening areas of the flow rate adjusting windows 46 located in the area Q3 on the intake port 25 side. In the example of FIG. 4, the opening area of the flow rate adjusting windows 46 is gradually reduced from the area Q1 toward the area Q3. Further, in the area Q3, the number of flow rate adjusting windows 46 is reduced as it goes toward the intake port 25 side.

By appropriately changing the sum of the opening areas of the flow rate adjusting windows 46 as described above, for example, the flow velocity of air taken in the center of the air intake grille 40 in the vehicle width direction can be made faster than the flow velocity of air taken in the left and right sides of the air intake grille 40 in the vehicle width direction. In other words, the flow velocity of air taken in the left and right sides of the air intake grille 40 in the vehicle width direction can be made slower than the flow velocity of air taken in the center of the air intake grille 40 in the vehicle width direction.

Generally, the rear seat 10 has a high usage frequency for the left and right rear seats 10 and a low usage frequency for the central rear seat 10. Thus, the flow velocity of the air taken into the air intake grille 40 on the left and right sides of the rear seat 10 which are used frequently is slower than that of the center of the rear seat 10 which is used less frequently. Therefore, the discomfort to a passenger sitting on the rear seat 10 can be further reduced.

SUMMARY

As described above, according to the embodiment, the flow rate adjusting plate 44 has the flow rate adjusting window 46 having the opening area smaller than the opening portion 45 inside the opening portion 45 formed by the first grille forming portion 42 and the second grille forming portion 43. Therefore, in the opening portion 45 on the passenger compartment side of the air intake grille 40, the flow velocity of the intake air can be reduced.

As a result, the vibration properties around the air intake grille 40 are improved and discomfort to a passenger can be reduced.

Further, the air intake grille 40 can prevent intrusion of foreign objects by the flow rate adjusting plate 44 together with the first grille forming portion 42 and the second grille forming portion 43.

The flow rate adjusting plate 44 is connected to the first grille forming portion 42 and the second grille forming portion 43 on the rear surface side of the air intake grille 40. Therefore, the flow rate adjusting plate 44 can be arranged to the rear side by the amount of the widths of the first grille forming portion 42 and the second grille forming portion 43 in the front-rear direction. As a result, the appearance design of the air intake grille can be improved.

Further, since the frame body 41, the first grille forming portion 42, the second grille forming portion 43, and the flow rate adjusting plate 44 are integrally formed, the manufacturing is easy and the handling property is excellent.

In addition, since the air intake grille 40 and the intake port 25 are offset in the vehicle width direction, it is possible to guide the air taken in from the air intake grille 40 to the intake port 25 while preventing foreign objects which have entered from the air intake grille 40 from entering the intake port 25.

When the air intake grille 40 and the intake port 25 are offset in the vehicle width direction, the air flow is fast in the region P2 on the intake port 25 side and the air flow is slow in the region P1 on the opposite side to the intake port 25. Therefore, by making the sum of the opening areas of the flow rate adjusting windows 46 located in the region P1 on the opposite side to the intake port 25 larger than the sum of the opening areas of the flow rate adjusting windows 46 located in the region P2 on the intake port 25 side, the flow velocity of air taken into the air intake grille 40 can be averaged in the vehicle width direction.

In addition, when the air intake grille 40 is disposed below the center of the rear seat 10, by making the sum of the opening areas of the flow rate adjusting windows 46 located in the central region Q2 smaller than the sum of the opening areas of the flow rate adjusting windows 46 located in the region Q1 on the opposite side to the intake port 25 and larger than the sum of the opening areas of the flow rate adjusting windows 46 located in the region Q3 on the intake port 25 side, the flow velocity of the air taken into the air intake grille 40 can be reduced at the left and right sides of the rear seat 10 which are frequently used with respect to the central side of the rear seat 10 which is not frequently used. Therefore, the discomfort to a passenger sitting on the rear seat 10 can be further reduced.

Moreover, since the air intake grille 40 is opened toward the front of the vehicle, it is possible to prevent foreign objects from entering from above when a passenger drops an object. The air intake grille 40 may be opened toward the rear of the vehicle.

Further, since the air intake grille 40 is disposed at the kick-up portion 33, that is, at the foot side of a passenger, it can reduce discomfort due to inhalation to the passenger compared to a case where the air intake grille 40 is disposed above the seat.

Further, the intake passage 52 of the intake duct 50 is provided with the step 53 upward from the air intake grille 40 toward the intake port 25. Therefore, even when water droplets enter the inside of the intake duct 50 or condensation occurs inside the intake duct 50, it is possible to prevent the water droplets and condensation water from entering through the intake port 25.

The invention is not limited to the embodiments and modifications described above. Modifications, improvements, and the likes can be made as appropriate.

For example, the number and shape of the opening portions 45 and the flow rate adjusting windows 46 can be arbitrarily set.

This application is based on a Japanese patent application (Japanese Patent Application No. 2017-132869) filed on Jul. 6, 2017, the contents of which are incorporated herein by reference.

REFERENCE SIGNS LIST

10: rear seat
21: case
31: front floor panel
33: kick-up portion
40: air intake grille
41: frame body
42: first grille forming portion
43: second grille forming portion
44: flow rate adjusting plate
45: opening portion
46: flow rate adjusting window
50: intake duct
53: step
D: electric device
P1: region on opposite side to intake port
P2: region on intake port side
Q1: region on opposite side to intake port
Q2: central region
Q3: region on intake port side
V: vehicle

The invention claimed is:

1. An air intake grille through which air in a passenger compartment of a vehicle passes, the air intake grille comprising:
   a frame body;
   a plurality of first grille forming portions;
   a plurality of second grille forming portions; and
   a flow rate adjusting plate disposed inside the frame body so as to be perpendicular to the first grille forming portions, wherein
   the plurality of first grille forming portions and the plurality of second grille forming portions are arranged in a lattice shape inside the frame body,
   the flow rate adjusting plate has a flow rate adjusting window inside an opening portion formed by the first grille forming portions and the second grille forming portions, and
   the flow rate adjusting window has an opening area smaller than the opening portion.

2. The air intake grille according to claim 1, wherein when a side of the passenger compartment is set as a front surface of the air intake grille, the flow rate adjusting plate is connected to the first grille forming portions and the second grille forming portions on a rear surface side of the air intake grille.

3. The air intake grille according to claim 1, wherein the frame body, the plurality of first grille forming portions, the plurality of second grille forming portions, and the flow rate adjusting plate are integrally formed.

4. A vehicle comprising:
   an air intake grille through which air in a passenger compartment of a vehicle passes;
   an electric device;
   a case for accommodating the electric device; and
   an intake duct for connecting an intake port provided in the case and the air intake grille, wherein
   the air intake grille includes a frame body, a plurality of first grille forming portions a plurality of second grille forming portions, and a flow rate adjusting plate disposed inside the frame body so as to be perpendicular to the first grille forming portions, wherein
   the plurality of first grille forming portions and the plurality of second grille forming portions are arranged in a lattice shape inside the frame body,
   the flow rate adjusting plate has a flow rate adjusting window inside an opening portion formed by the first grille forming portions and the second grille forming portions,
   the flow rate adjusting window has an opening area smaller than the opening portion, and
   the air intake grille and the intake port are arranged offset in a vehicle width direction.

5. The vehicle according to claim 4, wherein
   when the air intake grille is divided into two regions at a center in the vehicle width direction,
   a sum of opening areas of flow rate adjusting windows located in a region on an opposite side to the intake port is larger than a sum of opening areas of flow rate adjusting windows located in a region on the intake port side.

6. The vehicle according to claim 4, wherein
   when the air intake grille is divided into three regions in the vehicle width direction,
   a sum of opening areas of flow rate adjusting windows located in a central region is smaller than a sum of opening areas of flow rate adjusting windows located in a region on an opposite side to the intake port and is larger than the sum of the opening areas of the flow rate adjusting windows located in the region on the intake port side.

7. The vehicle according to claim 4, wherein
   the air intake grille opens toward a front or rear of the vehicle.

8. The vehicle according to claim 4, wherein
   the passenger compartment is provided with a rear seat behind a kick-up portion formed so as to rise from a front floor panel,
   the electric device is disposed below the rear seat, and
   the air intake grille is disposed in the kick-up portion.

9. The vehicle according to claim 8, wherein
   the air intake grille is disposed in the kick-up portion in a center of the rear seat.

10. The vehicle according to claim 4, wherein
    an intake passage of the intake duct is inclined upward from the air intake grille toward the intake port or has a step upward from the air intake grille toward the intake port.

* * * * *